United States Patent
Phillips et al.

(10) Patent No.: US 12,333,511 B2
(45) Date of Patent: *Jun. 17, 2025

(54) SYSTEM AND METHOD FOR MANAGING A NETWORK OF CASH SERVICE MACHINES

(71) Applicant: Capital One Services, LLC, McLean, VA (US)

(72) Inventors: Jeremy Phillips, Brooklyn, NY (US); Aditya Joshi, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 954 days.

This patent is subject to a terminal disclaimer.

(21) Appl. No.: 17/338,268

(22) Filed: Jun. 3, 2021

(65) Prior Publication Data
US 2021/0287192 A1 Sep. 16, 2021

Related U.S. Application Data

(63) Continuation of application No. 16/726,176, filed on Dec. 23, 2019, now Pat. No. 11,055,680.

(51) Int. Cl.
*G06Q 20/40* (2012.01)
*G06K 7/14* (2006.01)
(Continued)

(52) U.S. Cl.
CPC ....... *G06Q 20/1085* (2013.01); *G06K 7/1413* (2013.01); *G06K 7/1417* (2013.01);
(Continued)

(58) Field of Classification Search
CPC ............... G06Q 20/40; G06Q 20/1085; G06Q 20/3224; G06Q 20/3274; G06Q 20/3226;
(Continued)

(56) References Cited

U.S. PATENT DOCUMENTS

| 5,619,024 A | 4/1997 | Kolls |
| 5,728,999 A | 3/1998 | Teicher |

(Continued)

OTHER PUBLICATIONS

Buczkowski, Aleksander, Master Program in Geospatial Technologies, "Location-Based Marketing", The Academic Framework (Feb. 2012) Year 2012.

*Primary Examiner* — Hani M Kazimi
(74) *Attorney, Agent, or Firm* — HUNTON ANDREWS KURTH LLP (57) ABSTRACT

In a method of processing a cash transaction, a transaction processing system receives an account transaction request identifying a user account and a cash transaction to be carried out using a cash service machine (CSM). A set of CSMs available for processing the account transaction request is determined and a list of available CSMs is transmitted to the requesting user device. A request to process the transaction including an identification of a selected CSM is received the user device or the selected CSM. A unique authentication code is generated and transmitted to the processing requester. The transaction processing system receives from the non-process requester, an authentication request including a purported authentication code. The system then verifies that the purported authentication code matches the unique authentication code. Upon positive verification, the system transmits an instruction to the CSM to carry out a cash exchange according to the requested account transaction.

14 Claims, 5 Drawing Sheets

(51) Int. Cl.
  *G06Q 20/10* (2012.01)
  *G06Q 20/32* (2012.01)
  *G06Q 40/02* (2023.01)

(52) U.S. Cl.
  CPC ..... *G06Q 20/3224* (2013.01); *G06Q 20/3226* (2013.01); *G06Q 20/3274* (2013.01); *G06Q 20/3276* (2013.01); *G06Q 20/40* (2013.01); *G06Q 40/02* (2013.01)

(58) Field of Classification Search
  CPC .. G06Q 20/3276; G06Q 40/02; G06K 7/1413; G06K 7/1417
  USPC .......................................................... 705/43
  See application file for complete search history.

(56) References Cited

U.S. PATENT DOCUMENTS

| | | | |
|---|---|---|---|
| 6,056,194 A | 5/2000 | Kolls | |
| 6,397,126 B1 | 5/2002 | Nelson | |
| 6,430,470 B1 | 8/2002 | Nakajima et al. | |
| 6,584,309 B1 | 6/2003 | Whigham | |
| 6,711,465 B2 | 3/2004 | Tomassi | |
| 7,493,190 B1 | 2/2009 | Tomassi | |
| 9,047,600 B2 | 6/2015 | Zhou et al. | |
| 9,836,734 B2 | 12/2017 | Argue et al. | |
| 10,354,246 B1 | 7/2019 | Janiga | |
| 2002/0038167 A1 | 3/2002 | Chirnomas | |
| 2002/0077724 A1 | 6/2002 | Paulucci et al. | |
| 2002/0116208 A1 | 8/2002 | Chirnomas | |
| 2002/0165820 A1 | 11/2002 | Anvekar et al. | |
| 2003/0216960 A1 | 11/2003 | Postrel | |
| 2004/0256402 A1 | 12/2004 | Chirnomas | |
| 2004/0267663 A1 | 12/2004 | Karns et al. | |
| 2006/0206709 A1 | 9/2006 | Abrou et al. | |
| 2008/0116263 A1 | 5/2008 | Kameda et al. | |
| 2008/0126261 A1 | 5/2008 | Lovett | |
| 2008/0301049 A1 | 12/2008 | Dyson | |
| 2010/0312381 A1 | 12/2010 | Kameda | |
| 2011/0024495 A1 | 2/2011 | Anderson | |
| 2011/0068167 A1 | 3/2011 | Drummond et al. | |
| 2011/0258090 A1 | 10/2011 | Borsch et al. | |
| 2012/0136478 A1 | 5/2012 | Anand et al. | |
| 2013/0046697 A1 | 2/2013 | Schibuk | |
| 2013/0124411 A1 | 5/2013 | Kobres et al. | |
| 2014/0332339 A1 | 11/2014 | Crist et al. | |
| 2014/0332341 A1 | 11/2014 | Crist et al. | |
| 2014/0337211 A1 | 11/2014 | Crist et al. | |
| 2014/0338986 A1 | 11/2014 | Crist et al. | |
| 2016/0063481 A1 | 3/2016 | Gupta et al. | |
| 2016/0117880 A1 | 4/2016 | Crist et al. | |
| 2016/0162869 A1 | 6/2016 | Gupta et al. | |
| 2019/0073663 A1 | 3/2019 | Jamkhedkar et al. | |

SYSTEM AND METHOD FOR MANAGING A NETWORK OF CASH SERVICE MACHINES

CROSS REFERENCE TO RELATED APPLICATION

This application is a Continuation of U.S. application Ser. No. 16/726,176, filed Dec. 23, 2019, the complete disclosure of which is incorporated herein by reference.

FIELD OF THE INVENTION

This disclosure relates generally to cash service machines, and, more particularly, to systems and methods for processing account-related cash transactions at networked cash service machines having product or service vending functions.

BACKGROUND OF THE INVENTION

While mobile banking and cashless transactions are steadily increasing, there remains a need for convenient access to cash and means for making cash deposits. In recent years, there has been a proliferation of privately-owned automatic teller machines (ATMs). While these machines provide a degree of convenience, they typically result in significant fees to the user to cover operating costs. Business owners may see value in having such machines in their stores, but they may not wish to give up valuable retail space, particularly in relatively small establishments such as convenience stores. In such locations, it would be advantageous to provide convenient access to cash-based financial services without having to devote space to a dedicated ATM. At the same time, financial institutions want to provide as many access options to their customers as possible.

SUMMARY OF THE INVENTION

An illustrative aspect of the invention provides a method of processing a cash transaction for a user account. The method comprises receiving, by a transaction processing system from a user device associated with the user account, an account transaction request identifying the user account and a cash transaction to be carried out using a cash service machine (CSM). The method further comprises determining, by the transaction processing system, a set of CSMs available for processing the account transaction request, transmitting a list of the set of available CSMs and receiving from one of the set consisting of the user device and a selected CSM from the set of available CSMs, a request to process the cash transaction. The process request includes an identification of the selected CSM. The transaction processing system generates a unique authentication code for the requested cash transaction and transmits the unique authentication code to the one of the set consisting of the user device and a selected CSM from which the process request was received. The transaction processing system receives from the other of the set consisting of the user device and a selected CSM, an authentication request including a purported authentication code. The transaction processing system then verifies that the purported authentication code matches the unique authentication code for the transaction. The method further comprises, responsive to verification that the purported authentication code matches the unique authentication code, transmitting, by the transaction processing system to the selected CSM, an instruction to carry out a cash exchange according to the requested account transaction.

Another aspect of the invention provides a system for carrying out a cash transaction on a user account at a cash service machine. The system comprises a plurality of CSMs, each having a CSM location, an associated CSM identifier, and at least one of the set consisting of a product delivery arrangement and a service delivery arrangement. Each CSM also has a CSM communication interface in data communication with a first network, an authentication interface, and at least one of the set consisting of a cash dispenser and a cash receiver. Each CSM also has a CSM data processing system in communication with the CSM communication and authentication interfaces, the at least one of the set consisting of a product delivery arrangement and a service delivery arrangement, and the at least one of the set consisting of a cash dispenser and a cash receiver. The CSM data processing system is configured to carry out an authentication procedure using the authentication interface, receive instructions to carry out a cash transaction exchange including one of the set consisting of dispensing cash to a user of the user device and receiving cash from a user of the user device, and carry out the cash transaction exchange. The system further comprises a user device associated with the user account and having a data processor, a communication interface in communication with the data processor and configured for selective communication over a second network, a user interface comprising a visual display, a first image capturing device, and a memory accessible by the data processor. The memory has stored therein an account transaction application with instructions to be carried out by the data processor. The account transaction application is configured to receive, via the user interface, transaction information for a desired cash transaction and transmit, via the communications interface, an account transaction request. The account transaction request includes the cash transaction information. The account transaction application is further configured to receive a request response comprising a list of CSMs available to process the cash transaction. The cash transaction system further comprises a transaction processing system comprising a communication interface configured for selective communication with each of the plurality of CSMs via the first network and the user device via the second network. The transaction processing system further comprises a CSM database having stored therein location and capability information for each of the plurality of CSMs and a transaction request processor. The transaction request processor is configured to receive the account transaction request from the user device, construct the list of CSMs available to process the cash transaction using location and capability information from the CSM database, and transmit the request response to the user device. The cash transaction system still further comprises an authentication server configured to receive from one of the set consisting of the user device and a transaction CSM, a request to process the cash transaction. The process request includes an identification of the transaction CSM. The authentication server is further configured to generate a unique authentication code for the requested cash transaction and transmit the unique authentication code to the one of the set consisting of the user device and a transaction CSM from which the process request was received. The authentication server is also configured to receive from the other of the set consisting of the user device and a transaction CSM, an authentication request including a purported authentication code and to verify that the purported authentication code matches the unique authentication code for the transaction. Responsive to verification that the purported authentication code matches the unique authentication code, the authentication server transmits an instruction to the transaction CSM to carry out a cash exchange according to the requested account transaction.

Another aspect of the invention provides a transaction processing system for facilitating a cash transaction on a user account at a cash service machine. The system comprises a communication interface configured for selective communication with each of a plurality of CSMs via a first network and a user device associated with the user account via the second network. The system further comprises a transaction request processor configured to receive an account transaction request from the user device, construct a list of CSMs available to process the cash transaction, and transmit the request response to the user device. The system further comprises an authentication server configured to receive from one of the set consisting of the user device and a transaction CSM, a request to process the cash transaction. The process request includes an identification of the transaction CSM. The authentication server is also configured to generate a unique authentication code for the requested cash transaction and transmit the unique authentication code to the one of the set consisting of the user device and a transaction CSM from which the process request was received. The authentication server is also configured to receive from the other of the set consisting of the user device and a transaction CSM, an authentication request including a purported authentication code and to verify that the purported authentication code matches the unique authentication code for the transaction. Responsive to verification that the purported authentication code matches the unique authentication code, the authentication server transmits an instruction to the transaction CSM to carry out a cash exchange according to the requested account transaction.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides systems and methods for managing a network of cash service machines that provide convenient customer access to cash-based transactions and other financial account functions. As used herein, the term "cash service machine" or "CSM" means a network-enabled machine that can verify user authorization, communicate with a central account transaction processing system, and accept and dispense cash. In certain embodiments of the invention, a CSM may be an ATM operated by the account administrator or by a separate entity. In other embodiments, a CSM may be a merchant transaction processing system (e.g., at a retail store checkout counter). In particular embodiments, a CSM may be an automated product or service vending machine that is configured for accepting and dispensing cash in addition to its ordinary dispensing function.

Figure 1:
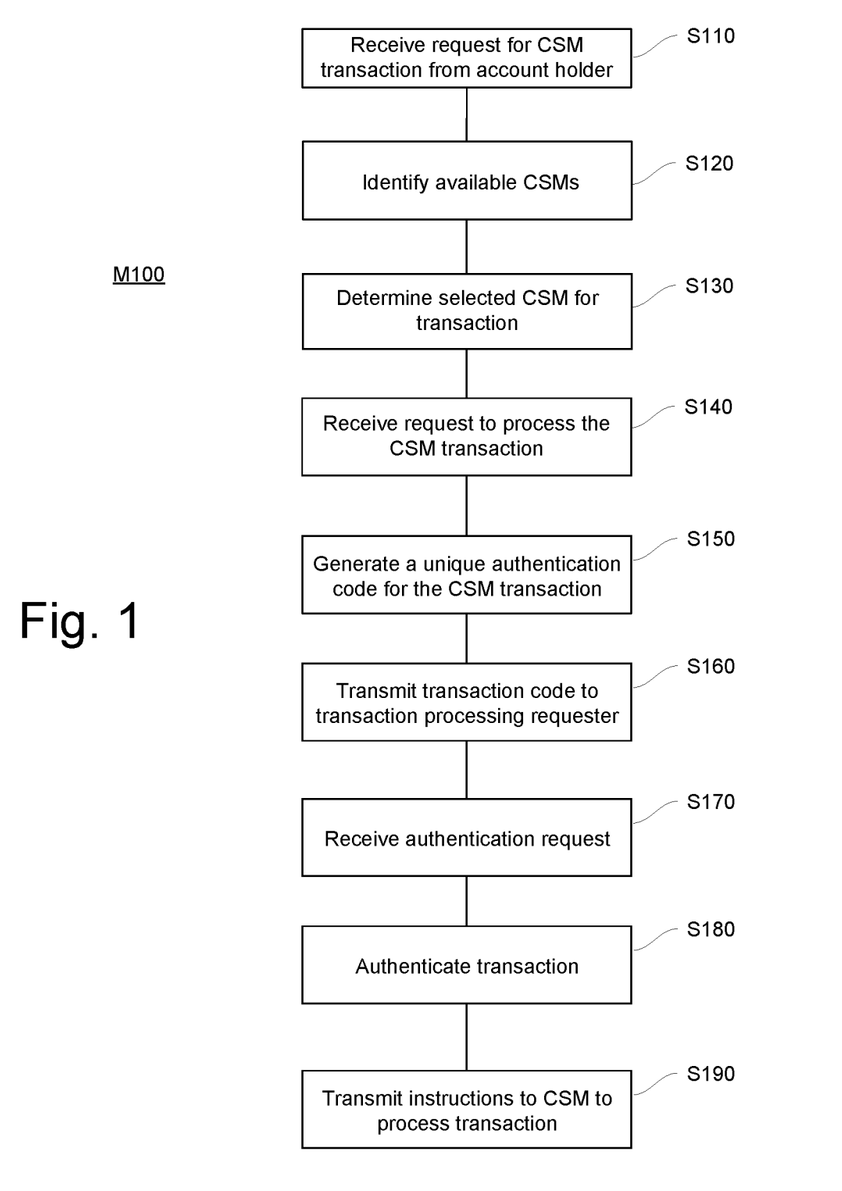
FIG. 1 is a flow chart of actions in a method of processing a cash transaction according to an embodiment of the invention.

The systems and methods of the invention provide the capability to direct an authorized account holder to an available, operable CSM and, upon arrival of the account holder at the CSM, process a cash transaction for that account holder using multiple authentication methods to assure account security. FIG. 1 illustrates a basic method M100 of processing a cash transaction for a user account according to an exemplary embodiment of the invention. At S110 of the method M100, a transaction processing system receives a CSM transaction request from a user device of an account holder. In some embodiments, this request may be constructed using an account-related application resident on the user device. The request may include identification information identifying the account, the account holder, or the user device. The request may further include an indication of a type of transaction the account holder wishes to carry out with the assistance of a CSM. The transaction type will typically involve the deposition to or withdrawal of cash from the account holder's account. In some cases, the transaction type may be a purchase of a product or service from the CSM. In other cases, the request may be for an action to complete an already initiated transaction. In some embodiments, the request may specify multiple transactions to be conducted at a single CSM.

At S120, the transaction processing system identifies a set of CSMs that are available to process the transaction or transactions requested by the account holder. This may include applying certain basic criteria for identifying an initial set of CSM candidates. Such criteria could include, for example, a requirement that candidate CSMs be within a defined region or within a maximum distance from a specified location such as the account holder's residence or a location specified by the account holder in the transaction request. In some embodiments, the requirement could be that the CSM be within a maximum distance from the location of the requesting user device at the time the request is made. In such embodiments, the transaction processing system may be required to determine the user device location using location service application on the a mobile device or by querying the user. In addition to basic criteria that might be applied to any request, the transaction processing system may also apply account-specific criteria previously established for the account. Such criteria could include, for example, elimination of CSMs in certain locations that are inaccessible to or inconvenient for the accountholder. In some cases, for example, the criteria might specify that only drive-up CSMs be included as candidates.

Figure 2:
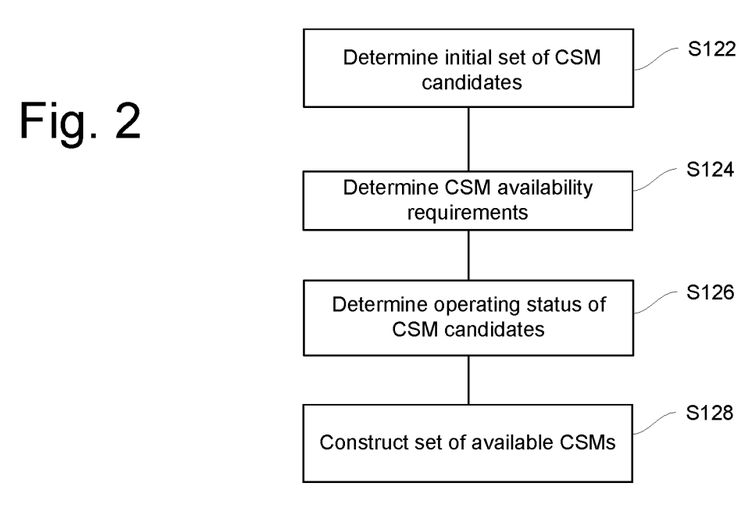
FIG. 2 is a flow chart of actions in a method of processing a cash transaction according to an embodiment of the invention.

The CSM candidate criteria for a particular account may be retrieved by the transaction processing system and applied to a complete list of network CSMs. CSMs meeting the candidate criteria may be assembled by the transaction processing system into an initial candidate set. The transaction processing system may then optionally evaluate the candidate CSMs to determine whether they are currently available and/or capable of carrying out the requested transaction. The actions involved this evaluation for an exemplary embodiment are shown in FIG. 2. At S122, the transaction processing system determines an initial set of candidates based on criteria such as those described above. At S124, the system may make a determination as to the availability requirements that the candidate CSMs must meet. Some availability requirements may be the same for all transactions. These would include, for example, requirements that the CSM be in operating condition and in communication with the processing system. Other requirements may vary depending on the characteristics of the requested transaction, the type of account, or the preferences of the account holder. In some cases, such requirements may be determinable based on information from the transaction request. For example, a withdrawal transaction would have inherently different requirements (e.g., a sufficient amount of dispensable cash) than would a deposit transaction. In another example, the request could specify a time window for arrival at the CSM, which would require that CSM candidates be accessible and operable within the time window. At S126, the transaction processing system determines the operating status of some or all of the candidate CSMs. This may include transmitting a request for an operating status report to and receiving an operating status report from each candidate CSM. The operating status report would include operating status information usable by the processing system to determine if a CSM is available to process the requested transaction. Such information could include the machine's current power status, operability of individual mechanical or communication mechanisms, cash or products available for dispensing, and availability of purchasable services. In some cases, the status information could include information on scheduled maintenance or other anticipated unavailability windows. In some embodiments, a status information request may also be transmitted to and CSM status information received from an administrator of one or more of the candidate CSMs.

Using the operating status information for a CSM, the transaction processing system may make a determination as to the availability of that CSM. In most cases, this will be a simple binary determination with some CSMs deemed "available" and others deemed "unavailable" for carrying out the transaction. In some cases, however, the candidate list may be prioritized based on relative availability based on the CSMs various limitations. In either case, any CSM not responding to the status report request may be deemed "unavailable". Based on these determinations, the processing system may construct a list of available CSMs at S128 meeting all basic and availability criteria.

At S130, the transaction processing system may optionally determine a particular CSM from the set of candidate CSMs. In some embodiments, this determination may include transmitting a selection request to the requesting user device, the request including a list of some or all of the candidate CSMs for display to the account holder. For convenience of the user, the candidate list may be further cut back based on final selection criteria. For example, the list may be limited to the ten CSMs nearest to the location of the user device or account holder address. The determination of the transaction CSM may further include receiving a response from the user device identifying the account holder-selected CSM. In some embodiments, the response may indicate an account holder-selected CSM that is not on the candidate list. In these embodiments, the processing system may carry out an additional check to determine the availability of the selected CSM. If that CSM is not available, the system may transmit a second selection request with an indication as to why the user-selected CSM could not be used.

In some embodiments, selecting a CSM from the candidate list may be a system-determined optimum location established based on tracking information and/or known habits of the account holder. For example, account holder transaction information may indicate that the account holder conducts a purchase transaction at a particular store or restaurant every work day. Based, at least in part, on this information, the transaction processing system could select a CSM at or near that store or restaurant. In another example, user device tracking information could be used to establish regular travel patterns of the account holder, which would allow selection of a CSM along a regular route of the account holder. Even if the above information is not used to make a final CSM selection, it may be used to prioritize the list of candidate options that are sent to the user device for display to the account holder.

Once a transaction CSM has been determined, the system may optionally transmit information on the anticipated transaction to either or both of the user device and the processing system of the selected CSM. Among other things, this would allow the CSM processing system to "reserve" capability to carry out the transaction. For example, the CSM could identify itself as unavailable to carry out additional withdrawal transactions if such transactions would cause its available cash to go below that needed to complete the account holder's transaction.

In some embodiments, rather than determining a particular transaction CSM, the transaction processing system may transmit to the account holder user device a list of some or all of the CSM candidates meeting the availability requirements. In these embodiments, the account holder may simply proceed to any of the CSMs on the list to process the transaction.

At S140, the transaction processing system receives a request to process the CSM transaction. In some embodiments, this request is received from the CSM in response to interaction of the CSM with a purported account holder, account holder user device, and/or transaction card. Typically, such interaction would include communication to the CSM of identification information (e.g., through wireless communication with the user device or a smart card or by reading of account information from a magnetic strip on a transaction card). The CSM may then include this information in the transaction processing request along with information identifying the CSM.

In other embodiments, the transaction processing request may be received from the requesting user device or another user device associated with the account. This request may be transmitted by the user device in response to interaction of the user device or an associated transaction card with the CSM. This interaction could be, for example, wireless communication between the user device and the CSM initiated by the user device once the user device is within a certain proximity of the CSM. In some cases, the interaction may be or include communication between a transaction card and the CSM. The transaction request would include information identifying the user device and/or the account. It would also include information sufficient for the transaction processing system to identify the CSM. This may be identification of the CSM or information on the location of the user device.

In response to receiving a transaction request, the transaction processing system may generate a unique authentication code for the CSM transaction at S150 and then transmit it at S160. If the transaction processing request was received from the CSM, the system transmits the authentication code to the user device, which then communicates the authentication code to the CSM. The authentication code may be communicated via wireless electronic communication. In some embodiments, the authentication code may be a graphic code (e.g., a bar code or QR code) that can be displayed on a display screen of the user device. Upon receiving this code from the processing system, the account holder may present the displayed code to a camera or scanning device of the CSM. In other embodiments, the authentication code may be an alpha-numeric code that can be displayed to the user, who can then manually enter the code on an input device on the CSM. In any of the above embodiments, the CSM may receive the authentication code and then transmit it to the transaction processing system in an authentication request.

If, on the other hand, the transaction processing request was received from the user device, the transaction processing system transmits the authentication code to the CSM, which then communicates the authentication code to the CSM. The authentication code may be communicated to the user device via wireless electronic communication. In embodiments where the authentication code is a displayable graphic code, the CSM may display the code on a display screen. When the code is displayed, the user can capture an image of the code with the camera (or other scanner) of the user device. In embodiments where the authentication code is an alpha-numeric code, the CSM may display it to the user, who can then manually enter the code into the user device. In any of these embodiments, the user device may receive the authentication code and then transmit it to the transaction processing system in an authentication request.

At S170, the transaction processing system receives an authentication request from either the CSM or the user device, as applicable to the method embodiment. In either case, the authentication request includes a purported authentication code. At S180, the transaction processing system authenticates the transaction by comparing the purported authentication code to the authentication code for the transaction. In response to verifying that the two match, the transaction processing system transmits an instruction to the CSM to proceed with the transaction.

Figure 3:
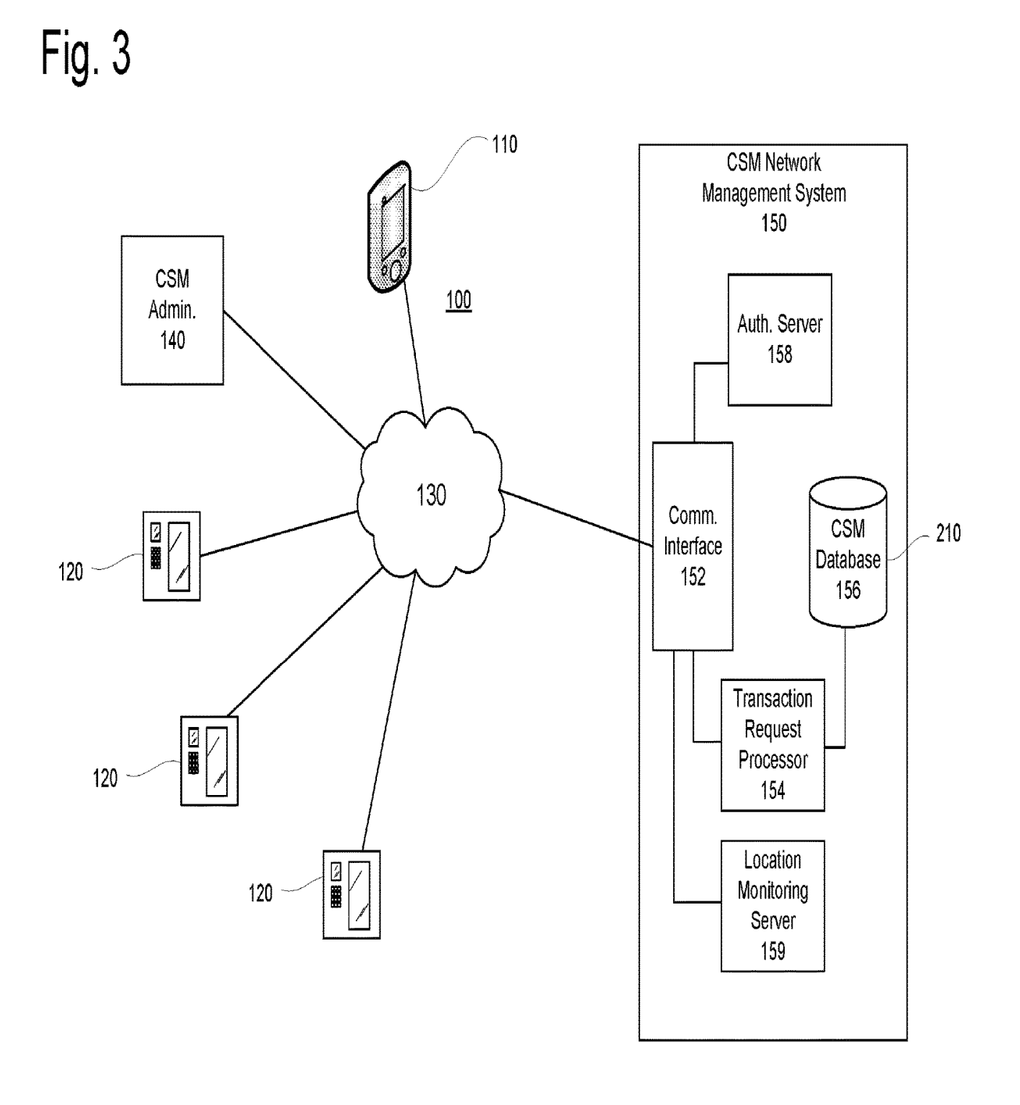
FIG. 3 is a schematic representation of a cash transaction processing system according to an embodiment of the invention.

Methods of the invention can be implemented on or in conjunction with a transaction processing system that incorporates and manages a network of cash service machines. FIG. 3 depicts a system 100 for processing a cash transaction at a networked CSM according to an embodiment of the invention. Various elements of the system 100 may be or include network-enabled computer systems, including, as depicted in FIG. 3, an account holder user device 110, each of a plurality of cash service machines 120, a CSM administrator 140, and a CSM network management system 150. Any or all of these system elements may be capable of communication with one another via a communication network 130. In some embodiments, certain components of the system 100 may communicate with one another via a second network in addition to or instead of the network 130.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. It will be understood that the depiction in FIG. is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 3.

The CSM network management system 150 is a network-enabled processing system configured for communication with one or more account holder user devices 110 and each of the plurality of cash service machines 120 via the network 130. The management system 150 includes a secure communication interface 152 in communication with the network 130 and configured to receive communications from the user devices 110 and the CSMs 120 and to provide an initial security screen to validate such communications. The management system 150 further includes a transaction request processor 154 that is configured for receiving CSM transaction requests from account holder-associated user devices 110. A transaction request may be received as a separate, standalone request (e.g., an email request) or may be made as part of an on-line interactive session between the user device 110 and the CSM network management system 150. In particular embodiments, the request may be transmitted by the user device 110 using an application resident on the user device 110.

A CSM transaction request may include identification information usable by the request processor 154 to identify the user device and/or the account with which the user device is associated. The request may further include transaction information on a transaction the account holder wishes to conduct using a CSM 120. This may include information indicating the type of transaction and characteristics of the transaction (e.g., monetary amounts). In some embodiments, it may also include current user device location information and/or information relating to a desired CSM location or area. The request processor 154 may be configured to conduct an initial authorization verification to assure that the user device 110 and/or the user are authorized to request and carry out the requested transaction.

The transaction request processor 154 is configured to process a transaction request by retrieving CSM information from a CSM database 156 and comparing it to selection criteria established for the transaction. Based on this comparison, the request processor 154 may construct an initial candidate list of CSMs 120. As previously discussed, initial selection criteria may be used to rule out CSMs 120 that are not capable of carrying out the requested transaction type and/or CSMs 120 not meeting location limitations. The CSM database 156 includes a CSM data record for each CSM 120 in the CSM network. The data record may include such information as a machine identifier, location of the CSM 120, merchant outlet association, accessibility limitations, transaction capabilities or limitations, and administrator information. Such information may be obtained by the management system 150 from a CSM administrator and stored in the database 156 at the time the CSM 120 is added to the system 100.

In determining whether location criteria are met, the transaction processor may require location information for the user device 110 at the time of the request. As will be discussed in more detail hereafter, such information may be provided by the location monitoring server 159 based on location service information received from the user device 110.

The transaction processor 154 may be configured to further reduce the set of CSM candidates for a particular transaction based on the current or future availability of each candidate. This may include transmitting to each candidate CSM 120 or CSM administrator 140 a status request and receiving status information in response. Such status response information is then used by the processor 154 to determine which candidate CSMs 120 are available to conduct the requested transaction.

The transaction request processor may 154 be configured to determine a final set of CSM candidates based on the initial selection criteria and/or candidate availability information. The processor 154 may then transmit the set of CSM candidates to the user device 110 for display to the account holder. In some embodiments, processor 154 may be configured to receive a response from the user device 110 that includes a selection of a particular CSM 120. In such embodiments, the request processor may transmit a notification to the transaction CSM 120 and/or the CSM administrator 140 for that CSM 120.

The authentication server 158 is a network-enabled processing system configured to assign an authentication code to a requested transaction. This code is used by the system 100 to assure the presence of an authorized user device 110 at the transaction CSM location when the transaction is to be processed. The authentication server 158 is further configured to receive a request to process the transaction. In some embodiments, this request is received from the transaction CSM 120 and includes identification of the CSM 120, identification of one or more of the account, the user device 110, and the account holder. The request may also include security information such as an account-related password or encrypted information from the user device 110. The authentication server 158 may be configured to verify association of the user device 110 with the account, identify the requested transaction, and/or to transmit the authentication code for the transaction to the user device 110.

In other embodiments, the transaction processing request is received from the user device and includes identification of the user device 110 and/or the account. The request may also include information on the location of the user device 110 and/or identification of the transaction CSM 120. The authentication server 158 may be configured to determine the requested transaction and the transaction CSM 120, and transmit the authentication code to the transaction CSM 120.

The authentication server 158 is configured to receive an authentication response from either the user device 110 (if the authentication code was transmitted to the transaction CSM) or the transaction CSM 120 (if the authentication code was transmitted to the user device 110). The response may include a purported authentication code, which the server 158 compares to the actual authentication code for the transaction. The server 158 is configured to, upon determination that the authentication codes match, transmit instructions to the transaction CSM 120 to carry out the transaction.

The location monitoring server 159 is a network-enabled server or other processing system in communication with the network 130 via the communication interface 152 and is generally configured to determine or estimate the location of the account holder. In some embodiments, the location monitoring server 159 is configured to continuously or periodically receive location information from a mobile user device 110 that is associated with the account and has a location service application and to make this location information available to the transaction request processor 154 and the authentication server 158. The location monitoring server 159 may, in addition or instead, be configured to transmit a request to the user device 110 to activate the location service if it determines that the service is not active. Such a request may be transmitted upon receipt of a transaction request, upon receipt of a transaction processing request, or at a particular time prior to a requested transaction window. If the location service is not activated or no service is available, the location monitoring server 159 may transmit a request to the user for current location information.

Figure 4:
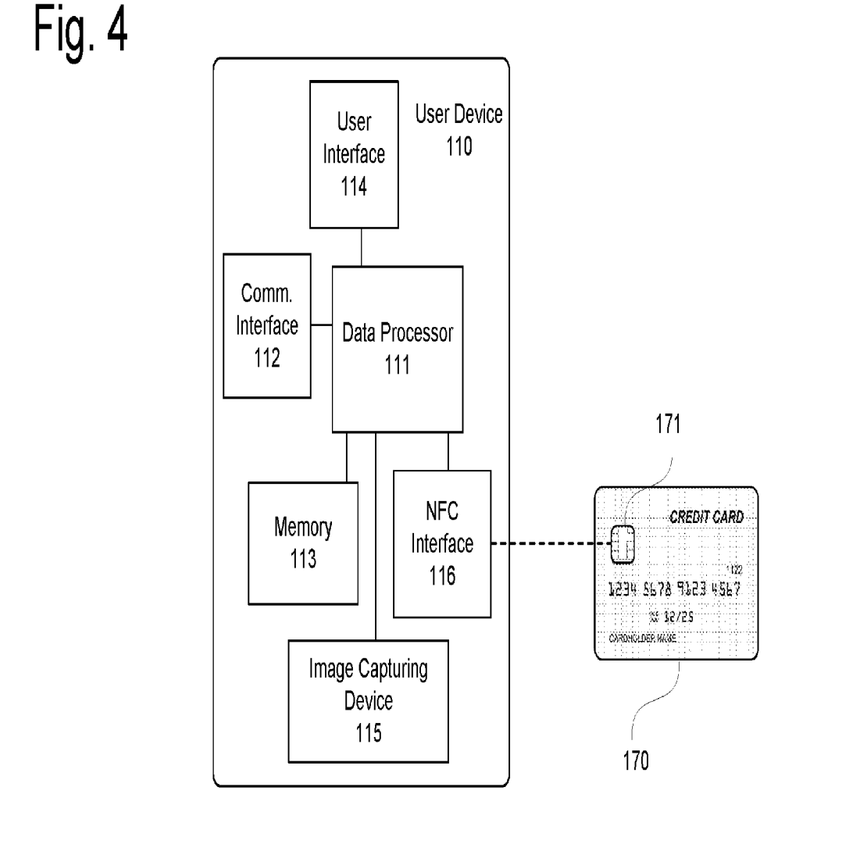
FIG. 4 is a schematic representation of a user interface device usable in embodiments of the invention.

With reference to FIG. 4, an account holder (or other user) processing device 110 may be any data processing and/or communication device that an account holder uses to carry out a transaction and/or to communicate with an application processing authority or the CSM network management system 150 including, but not limited to a smartphone, a laptop, a desktop computer, and a tablet. In particular embodiments, the account holder device 110 includes an on-board data processor 111 in communication with a memory module 113, a user interface 114, and a communication interface 112. The device 110 may also include an image capturing device (e.g., a digital camera or scanner). The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device can include one or more of these memories.

The user interface 114 includes a user input device or mechanism, which can be any device for entering information and instructions into the account holder device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired or wireless data communication capability for connecting the device 110 to the network 130 or other communication network. The user device 110 may also include an NFC interface 116 that can be configured to support near field communication with an NFC transmitter/receiver. The NFC interface 112 may, in particular, be configured for near field communication with a chip-mounted NFC device 171 of a smart transaction card 170 associated with a transaction account.

In embodiments of the invention, the memory 113 may have stored therein one or more applications usable by the data processor 111 to conduct and/or monitor transactions between the account holder device 110 and a merchant device or transaction processing system over the network 130. These applications may include instructions usable by the data processor 111 to identify transaction events, store event data in the memory 113, and communicate event data to a transaction processor.

In certain embodiments, the memory 113 may have stored therein a CSM transaction application associated with a user account for facilitating the use of the transaction processing system 100. This application may include instructions to receive information from the user via the user interface 114 regarding a transaction the account holder wishes to conduct using a CSM 120. The application further include instructions to use the user-supplied information to construct and transmit a CSM transaction request to the transaction request processor 154 of the CSM network management system 150. The user information may include a desired type of transaction and specific characteristics thereof. The information may also include a desired transaction CSM location or a desired area within which the transaction CSM 120 should be located. It may also include any limitations on the transaction or the transaction CSM 120. In some embodiments, the user information may include a current location of the account holder or user device. The transaction request may include the user-supplied information, information identifying the user device, the account holder, and/or the account. The application may be further configured to instruct the data processor 111 to communicate with the CSM network management system 150 to provide additional information as necessary. This may be accomplished through an interactive session with the CSM network management system 150 in which transaction and/or CSM location options may be received from the transaction request processor 154 and presented to the user via the user interface 114. The application may include instructions to transmit to the transaction request processor 154 a selected transaction CSM.

The transaction application may also include instructions configured for establishing communication with the authentication server 158 to facilitate authentication of the user device and/or the account holder upon establishing interaction with the transaction CSM 120. In embodiments where the authentication process is initiated by the transaction CSM's transmission of an authentication request to the authentication server 158, the application is configured for receiving an authentication code from the authentication processor 158 and displaying it to the account holder via the user interface 114. The account holder may then communicate the authentication code to the transaction CSM 120. In embodiments where the code is alpha-numeric, this may be done by entering the code via a user interface of the transaction CSM 120. In embodiments where the code is a graphic code (e.g., a bar code or a QR code), this may be done by presenting the display of the user device 110 to an image capturing device of the transaction CSM 120, which captures an image of the code and transmits it to the authentication server 158 for authentication.

In embodiments where the authentication process is not initiated by the transaction CSM, the transaction application may be configured to construct the authentication request and transmit it to the authentication server 158. The application may be further configured to receive a purported authentication code obtained from the transaction CSM. In some embodiments, the purported code may be displayed to the account holder on a display screen of the CSM 120. In embodiments where the code is alpha-numeric, the account holder may view the code and enter it into the user device 110 via the user interface 115. In such embodiments, and, in particular, in embodiments where the authentication code is a graphic code, the application may be configured to receive an image of the code displayed by the CSM 120. This image may be obtained, for example, by the account holder capturing a digital image of the CSM display using the image capturing device 115. The application may be further configured to transmit the purported authentication code to the authentication server 158 for comparison to the authentication code for the transaction.

In some embodiments of the invention, the transaction application may be configured for automatically establishing wireless communication with the transaction CSM 120 when the user device 110 is brought to within a minimum distance of the transaction CSM 120. This communication may be established for example, using the NFC interface 116. The application may be configured to receive CSM identification information via such communication and to include this information in the transaction processing request. Alternatively, or in addition, the application may be configured to communicate user device or account information to the transaction CSM 120, which may then use that information in a transaction processing request.

The memory 113 may also have stored therein a location service application having instructions for the data processor 111 to generate device location information that can be used to determine the location of the user device 110. The application may further include instructions to transmit the location information to the location monitoring server 159 via the communication interface 112 and the network 130.

The cash service machines 120 of the system 100 may be any machine, system, or arrangement having the capability to receive and/or dispense cash for the purpose of processing an account transaction and that has a network-enabled data processing system capable of communication with the CSM network management system 150. In many cases, the CSMs 120 are also vending machines configured to dispense products or to initiate services upon receiving payment from a customer.

Figure 5:
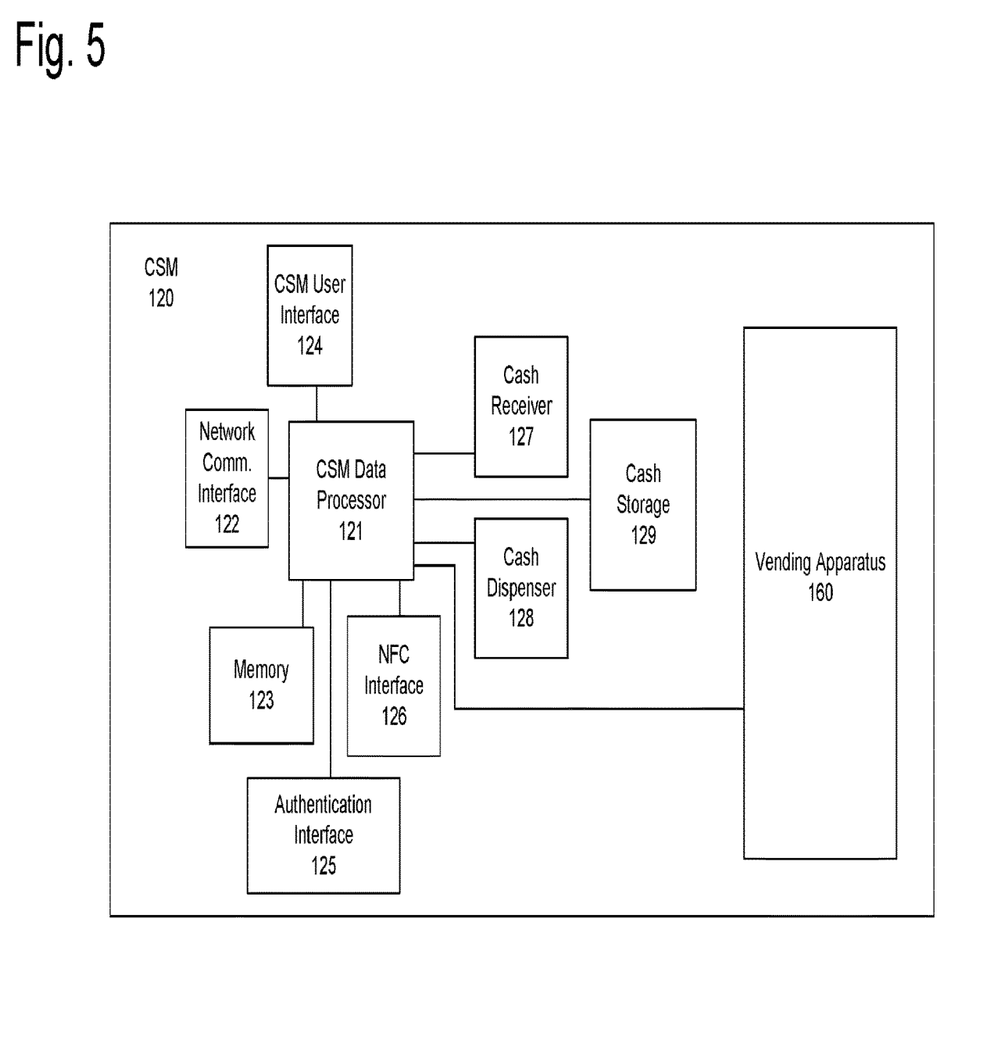
FIG. 5 is a schematic representation of a cash service machine according to an embodiment of the invention.

FIG. 5 is a schematic representation of a CSM 120 according to an embodiment of the invention. The CSM 120 includes a CSM data processor 121 and a user interface 124 that is configured for receiving information from and displaying information to a CSM user. The user interface 124 may include any device for entering information and instructions into the CSM, such as a touch-screen, keyboard, cursor-control device, microphone, stylus, or digital camera. The user interface 124 may also include a display, which can be any type of device for presenting visual information such as a computer monitor, a flat panel display, and a mobile device screen, including liquid crystal displays, light-emitting diode displays, plasma panels, and cathode ray tube displays. The display may, in particular, be configured for displaying a CSM transaction authentication code. In some embodiments, the CSM 120 may also have an authentication interface 125 configured for capturing a digital image of a purported authentication code. The authentication interface 125 may be any digital image capturing device such as a digital camera or scanner positioned to allow a user to present for capture an image displayed on a user device 110.

The CSM 120 includes either or both of a cash receiver arrangement 127 and a cash dispenser 128. The cash receiver arrangement 127 may be any mechanism configured for securely receiving cash from a user, determining an amount of cash received, and depositing the cash into a secure cash storage arrangement 129. In some embodiments, the cash receiver arrangement may also be configured for receiving and scanning checks or other documents required for processing a CSM transaction. The cash dispenser 128 may be any mechanism configured for drawing a specified amount of cash from a cash storage arrangement 129 and dispensing it to an authorized CSM user.

In some embodiments, the CSM 120 may include a vending apparatus 160 in communication with the CSM data processor 121. The vending apparatus 160 may be or comprise any conventional vending machine for dispensing products including, but not limited to consumer goods, financial products (e.g., prepaid cards), and software downloads. The vending apparatus 160 may also comprise a conventional machine for initiating a service. This could include, for example, a payment machine for an automatic car wash or a machine for exchanging coins for paper currency. The operation of the vending apparatus 160 may be controlled by the CSM data processor 121 and may make use of the cash receiver 127 and cash dispenser 128 for product or service purchase transactions.

The CSM 120 includes a CSM data processor 121 configured to communicate over the network 130 via a network communication interface 122. The CSM data processor 121 is in communication with a memory 123, which has stored therein information associated with the operation of the CSM 120. This may include identification information (e.g., a CSM identifier) and/or location information. The memory 123 may also have applications installed therein with instructions for carrying out vending and reporting operations. This may include, for example, an application configured for processing vending machine service or product purchases and providing instructions to the vending apparatus 160. It may also include transmitting purchase and other transaction information to a CSM administrator 140.

The memory 123 may also have a cash transaction application stored therein. The cash transaction application may include instructions for establishing communication with a user device 110 and/or a transaction card 170 of an account holder. In some embodiments, the application may be configured to accomplish this through the use of an NFC interface 126, which may be configured to communicate with either or both of the user device 110 and the transaction card 171. The cash transaction application may be further configured for authenticating a CSM transaction requested by an account holder. This may include receiving a CSM transaction authentication code from the authentication server 158 and presenting that code to the requesting account holder using a display of the user interface 124. The code would then be transmitted by the user device to the authentication server 158 for authentication as previously discussed. Alternatively, the authentication instructions may include instructions to capture a digital image of a purported authentication code using the authentication interface 125 and transmitting the purported authentication code to the authentication server 158 for authentication. In either case, the cash transaction application may be further configured to receive instructions from the authentication server 125 to carry out the requested transaction upon authentication by the server 125. This may include dispensing a specified amount of cash via the cash dispenser or prompting the account holder to insert an amount of cash into the cash receiver 127 and receiving such cash into the cash storage 129. The cash transaction application may be further configured to transmit transaction completion information to the CSM network management system 150 and/or the CSM administrator 140.

The present invention provides a method and system for assembling new and existing vending machines and other cash service machines into a network for carrying out cash and other account-related transactions. In many cases, the incorporation of existing systems may be accomplished without significant modification to the operating systems of the machines. The result is a vast improvement in the availability and convenience of cash-based account functions for account holders.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method of processing a cash transaction for a user account, the method comprising:
   receiving, by a transaction processing system from one of the set consisting of a user device associated with the user account and a user-selected cash servicing machine (CSM), a request to process a cash transaction by the user-selected CSM, the process request including an identification of the user-selected CSM;
   generating, by the transaction processing system, a unique authentication code for the requested cash transaction;
   transmitting the unique authentication code by the transaction processing system to one of the set consisting of the user device and the user-selected CSM;
   receiving, by the transaction processing system from the other of the set consisting of the user device and the user-selected CSM, an authentication request including a purported authentication code;
   verifying, by the transaction processing system, that the purported authentication code matches the unique authentication code for the transaction; and
   responsive to verification that the purported authentication code matches the unique authentication code, transmitting, by the transaction processing system to the user-selected CSM, an instruction to carry out the requested cash transaction.

2. The method of processing a cash transaction according to claim 1, further comprising, responsive to verification that the purported authentication code matches the unique authentication code:
   receiving, by the transaction processing system from the user-selected CSM a notification of completion of the cash exchange, and
   transmitting information for the cash transaction to an account processor.

3. The method of processing a cash transaction according to claim 1, wherein the cash transaction is one of the set consisting of a cash deposit to the user account, a cash withdrawal from the user account, and a purchase from the user-selected CSM.

4. The method of processing a cash transaction according to claim 1, further comprising:
   receiving, by the transaction processing system from the user device prior to receiving the request to process a cash transaction, an account transaction request identifying the user account and a prospective cash transaction;
   determining, by the transaction processing system, a set of CSMs available for processing the account transaction request; and transmitting, by the transaction processing system to the user device, a list of the set of available CSMs,
wherein the user-selected CSM is included in the list transmitted to the user device.

5. The method of processing a cash transaction according to claim 4, wherein the action of determining the set of CSMs available for processing the account transaction request includes:
obtaining, from a CSM database, an initial set of CSMs that meet predetermined availability requirements;
determining a current operating state for each of the initial set of CSMs; and
constructing the set of CSMs available for processing the account transaction request based on the current capability states of CSMs in the initial set of CSMs.

6. The method of processing a cash transaction according to claim 5, wherein the predetermined availability requirements include a requirement that available CSMs be within a maximum distance from the user device.

7. The method of processing a cash transaction according to claim 5, wherein the predetermined availability requirements include a requirement that available CSMs be configured for conducting the requested transaction.

8. The method of processing a cash transaction according to claim 5, wherein the action of determining a current operating state includes:
transmitting an operating state request to each of the initial set of CSMs, and
establishing the current operating state for each CSM based on operating state information received in response to the operating state request.

9. The method of processing a cash transaction according to claim 5, wherein the operating state information includes at least one of the set consisting of current operability, current product or service availability, and cash availability.

10. The method of processing a cash transaction according to claim 1, wherein the unique authentication code is a graphic code visually displayable by the one of the set consisting of the user device and a user-selected CSM to which the code is transmitted by the transaction processing system.

11. A transaction processing system for facilitating a cash transaction on a user account at a cash service machine (CSM), the system comprising:
a communication interface configured for selective communication with each of a plurality of CSMs via a first network and a user device associated with the user account via a second network,
an authentication server configured to
receive from one of the set consisting of the user device and a transaction CSM, a request to process a cash transaction, the process request including an identification of the transaction CSM,
generate a unique authentication code for the requested cash transaction,
transmit the unique authentication code to one of the set consisting of the user device and the transaction CSM,
receive from the other of the set consisting of the user device and the transaction CSM, an authentication request including a purported authentication code,
verify that the purported authentication code matches the unique authentication code for the transaction; and
responsive to verification that the purported authentication code matches the unique authentication code, transmit an instruction to the transaction CSM to process the cash transaction.

12. The transaction processing system for facilitating a cash transaction according to claim 11, wherein the cash transaction is one of the set consisting of a cash deposit to the user account, a cash withdrawal from the user account, and a purchase from the transaction CSM.

13. The transaction processing system for facilitating a cash transaction according to claim 11, further comprising:
a transaction request processor configured to
receive the cash transaction request from the user device,
construct a list of CSMs available to process the cash transaction, and
transmit a request response to the user device including the list of CSMs available to process the cash transaction.

14. The transaction processing system for facilitating a cash transaction according to claim 13, wherein the transaction request processor is configured to, as part of the action to construct a list of CSMs available to process the cash transaction:
obtain, from a CSM database, an initial set of CSMs that meet predetermined availability requirements;
determine a current operating state for each of the initial set of CSMs; and
construct the set of CSMs available for processing the account transaction request based on the current capability states of CSMs in the initial set of CSMs.

* * * * *